Patented July 17, 1934

UNITED STATES PATENT OFFICE 1,966,478

PRODUCTION OF AMINES

Karl Baur, Ludwigshafen-on-the-Rhine, Germany, assignor to I. G. Farbenindustrie Aktiengesellschaft, Frankfort-on-the-Main, Germany No Drawing. Application January 17, 1930, Serial No. 421,611. In Germany January 30, 1929

9 Claims. (Cl. 260—127)

The present invention relates to improvements in the production of amines.

I have now found that aliphatic or cyclic primary amines can be prepared by passing vapors of unsaturated carbonyl compounds, i. e. aldehydes and ketones, in the vapor phase and in admixture with hydrogen and a considerable quantity of ammonia, over hydrogenation catalysts. By this process, contrary to expectation, the simultaneous far reaching formation of amines and the complete hydrogenation of olefinic as well as of aromatic double linkages between carbon atoms may be effected in one working operation. The reaction temperature is generally between about 50° and 250° centigrade.

The process is advantageously carried out in a cycle by circulating the mixture of hydrogen and ammonia. In order to avoid a resinification of the unstable unsaturated aldehydes or ketones before their contact with the catalysts, the aldehydes or ketones are preferably evaporated singly and the vapors are led together with fresh hydrogen into the reaction vessel in which the mixture is then mixed with the circulating preheated mixture of hydrogen and ammonia. The content of ammonia of the circulating gaseous mixture can easily be kept constant by electrothermically and continuously measuring and registering the content of ammonia and adding ammonia and hydrogen according to the consumption. The hydrogenation catalysts already known are suitable as the catalysts and in particular those catalysts which contain at least one metal of the 8th group of the periodic system and which are activated by additions of difficultly reducible oxides the metals of which belong to the 5th and 6th groups of the periodic system. By the addition of alkaline substances or substances having an alkaline action, among which are to be understood to be included the stable oxides of manganese, it is possible to obtain certain amounts of the corresponding secondary amines in addition to the primary amines formed which are the main product.

The following examples will further illustrate how the said invention may be carried out in practice, but the invention is not restricted to these examples.

Example 1

Crotonaldehyde in the vapor phase is led together with equal parts by volume of hydrogen and ammonia over a hydrogenation catalyst at a temperature of 130° centigrade. The catalyst may be prepared for example by mixing each 100 grams of nickel oxide with each 40 grams of cobalt carbonate, making the mixture into a paste with each 100 cubic centimeters of a 5 per cent solution of chromic acid, drying the mass and applying the powder obtained together with colloidal silica onto each 0.6 liter of granular pumice stone. After reduction with hydrogen at 350° C. the catalyst is ready for use. The condensate contains normal butylamine in good yields in addition to a little dibutylamine.

Example 2

Finely divided nickel oxide is made into a paste with colloidal silica and the paste is deposited on pumice granules. After feeding the mass into a suitable reaction vessel and reducing the oxide with the aid of hydrogen in the usual manner a mixture of 4 units by volume of vaporized acrolein, 60 units by volume of ammonia and 40 units by volume of hydrogen is passed at 125° centigrade over the catalytic mass. N-propylamine is obtained in a good yield from the condensate together with a small quantity of n-propyl alcohol.

Example 3

A mixture of 2 units by volume of vaporized cinnamic aldehyde, 53 units by volume of ammonia and 47 units by volume of hydrogen is passed at 150° centigrade over the catalytic mass described in the foregoing example. The condensate is freed from ammonia, rendered slightly acid, blown with steam and finally rendered alkaline again. By distilling the oil obtained at reduced pressure pure γ-phenyl-n-propylamine with a boiling point of from 102° to 104° centigrade at 18 millimeters (mercury gauge) is obtained.

What I claim is:—

1. In the catalytic production of saturated primary and secondary amines from aldehydes and ammonia, the step which comprises passing vapours of aldehydes having the aldehyde group attached to an unsaturated straight chain together with at least equimolecular quantities of ammonia and with hydrogen over a hydrogenation catalyst.

2. In the catalytic production of saturated primary and secondary amines from aldehydes and ammonia, the step which comprises passing vapours of aldehydes having the aldehyde group attached to an unsaturated straight chain together with at least equimolecular quantities of ammonia and with hydrogen over a hydrogenation catalyst at a temperature between 50° and 250° C.

3. In the catalytic production of saturated, primary and secondary amines from aldehydes and ammonia, the step which comprises passing vapours of aldehydes having the aldehyde group attached to an unsaturated straight chain together with at least equimolecular quantities of ammonia and with hydrogen over a hydrogenation catalyst containing at least one metal of the 8th group of the periodic system.

4. In the catalytic production of saturated, primary and secondary amines from aldehydes and ammonia, the step which comprises passing vapours of aldehydes having the aldehyde group attached to an unsaturated straight chain together with at least equimolecular quantities of ammonia and with hydrogen over a hydrogenation catalyst containing at least one metal of the 8th group of the periodic system at a temperature between 50° and 250° C.

5. In the catalytic production of saturated primary and secondary amines from aldehydes and ammonia, the step which comprises passing vapours of aldehydes having the aldehyde group attached to an unsaturated straight chain together with at least equimolecular quantities of ammonia and with hydrogen over a hydrogenation catalyst containing at least one metal of the 8th group of the periodic system and an activator consisting of a difficulty reducible oxide of the metals of the 5th and 6th groups of the periodic system.

6. In the catalytic production of saturated, primary and secondary amines from aldehydes and ammonia, the step which comprises passing vapours of aldehydes having the aldehyde group attached to an unsaturated straight chain together with at least equimolecular quantities of ammonia and with hydrogen over a hydrogenation catalyst containing at least one metal of the 8th group of the periodic system and an activator consisting of a difficultly reducible oxide of the metals of the 5th and 6th groups of the periodic system at a temperature between 50° and 250° C.

7. In the catalytic production of saturated, primary and secondary amines from aldehydes and ammonia, the step which comprises passing vapours of aldehydes having the aldehyde group attached to an unsaturated straight chain together with at least equimolecular quantities of ammonia and with hydrogen over a hydrogenation catalyst containing at least nickel at a temperature between 50° and 250° C.

8. In the catalytic production of saturated, primary and secondary amines from aldehydes and ammonia, the step which comprises passing vapours of aldehydes having the aldehyde group attached to an unsaturated straight chain together with at least equimolecular quantities of ammonia and with hydrogen over a hydrogenation catalyst containing at least nickel and an activator consisting of a difficulty reducible oxide of the metals of the 5th and 6th groups of the periodic system at a temperature between 50° and 250° C.

9. The process for the production of n-butyl and n-dibutyl amines which comprises passing vapours of croton aldehyde together with at least equimolecular quantities of ammonia and with hydrogen over a hydrogenation catalyst containing at least one metal of the 8th group of the periodic system at a temperature between 50° and 250° C.

KARL BAUR.